United States Patent [19]

Songer

[11] Patent Number: 4,710,799
[45] Date of Patent: Dec. 1, 1987

[54] HIGH RESOLUTION COLOR TELEVISION

[75] Inventor: Jimmie D. Songer, Burleson, Tex.

[73] Assignee: High Resolution Television, Inc., Los Angeles, Calif.

[21] Appl. No.: 623,421

[22] Filed: Jun. 22, 1984

[51] Int. Cl.$^4$ ........................................... H04N 11/06
[52] U.S. Cl. ..................................... 358/12; 358/11
[58] Field of Search ................... 358/11, 12, 21 R, 23, 358/41, 50, 141, 36, 37

[56] References Cited

U.S. PATENT DOCUMENTS 4,521,803  6/1985  Gittinger ............................... 358/12

Primary Examiner—Michael A. Masinick
Attorney, Agent, or Firm—Freilich, Hornbaker, Rosen & Fernandez

[57] ABSTRACT

The information signal for a green camera tube modulated to scan each line in an undulating path is sampled by a filter trap at the frequency of modulation in a narrow band (about $\pm\frac{1}{2}$ MHz) and combined with the red and blue camera tube signals in the same proportion that each contributes to the total luminance relative to the green information signal thereby pseudomodulating the red and blue camera tube information signals. Although it is preferable to do this at the camera, thereby having to do it only once for the television transmission system, it may be done at the display tube. This modulation of the green tube scan, and pseudomodulation of the red and blue tube scan not only increases resolution for color television but also eliminated aliasing because the scan of all color camera tubes is effectively undulating so that there can be no scan parallel to horizontal edges of an image that causes aliasing in normal interlaced field of scan lines that are straight horizontal lines.

5 Claims, 5 Drawing Figures

HIGH RESOLUTION COLOR TELEVISION

BACKGROUND OF THE INVENTION

This invention relates to television, and more particularly to an improved method and apparatus for increasing the vertical resolution of color television using the method disclosed in copending application Ser. No. 06/515,220, now U.S. Pat. No. 4,589,012.

Briefly, vertical resolution is increased for standard television in accordance with the invention disclosed in the aforesaid patent application by modulating the vertical scan axis (deflection field) of a television camera such that each active scanning line traverses an undulatory path in phase from line to line rather than a straight line, i.e., oscillates in phase from line to line about the normal scan lines. The amplitude of the modulation is preferably sufficient for interlaced lines of a frame to intrude the area of adjacent lines. The video signal thus produced by actually scanning areas above and below the normal scan lines is then transmitted as for the normal scanning lines, which can be within the vestigial bandwidth limit of about 4 MHz for NTSC broadcast transmission, as described in U.S. patent application Ser. No. 06/534,592, now U.S. Pat. No. 4,620,217.

At a monitor or television receiver, a local oscillator modulates the vertical scan axis of each line to be at the same frequency and phase as the modulation employed in the television camera to synchronously reproduce each line of a frame. The local oscillator may be synchronized with the television camera by information contained in the received video signal. For example, in NTSC color transmission, a gated burst of the color carrier is transmitted during horizontal blanking periods for use in regenerating the color reference in the monitor or television receiver referred to generally as the display unit. Consequently, a convenient modulation frequency is the fundamental, i.e., the same frequency as the color carrier (3.579545 MHz under the NTSC system), or preferably some multiple or submultiple of that frequency. In any case, if the modulation in the television camera and the display unit are synchronized and in phase from line to line, the display unit will reproduce the frame in the same manner as it was scanned in the camera, which is with increased vertical resolution.

The second harmonic (7.15909 MHz), or some multiple of the second harmonic of the color carrier frequency is preferred over the fundamental (3.579545 MHz) because, at the standard 15.735 kHz line frequency, each line will then have a whole number of modulation cycles, such as 455 for the second harmonic, rather than a fractional number of modulations, such as 227.5 for the fundamental, thus making it easier to maintain the same modulation phase from line to line. However, a fraction of the color subcarrier frequency may also be used, such as one half, to produce modulation of a line with one whole number of cycles to facilitate the need to synchronize the phase of the line modulation from line to line.

SUMMARY OF THE INVENTION

In accordance with the invention, the television signals R and B from unmodulated red and blue camera pick-up tubes are pseudomodulated by sampling and adding to each an amount of the signal G from the green camera tube whose scan line is vertically modulated at a high frequency, preferably twice the color reference frequency to implement the more basic high resolution television technology of the aforesaid application Ser. No. 06/515,220. The amount added is in the same proportion that the R and B signals bear to the total luminance signal Y, which is $0.3R + 0.11B + 0.59G = 1.0Y$. This pseudomodulation may take place at the input to the color encoder at the camera, or at the color decoder at the receiver or monitor.

DESCRIPTION OF THE BASIC PRIOR INVENTION

Figure 1:
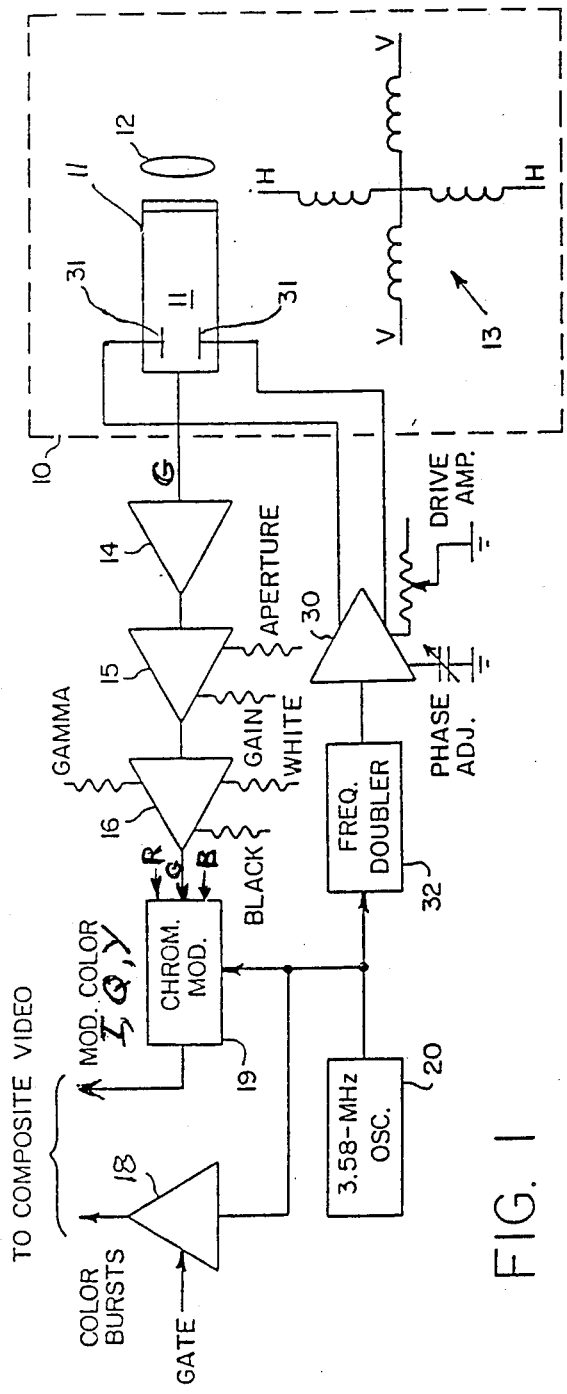
FIG. 1 illustrates that part of a color television camera embodying the present invention disclosed in the aforesaid U.S. Pat. No. 4,589,012.

Referring to the drawings, FIG. 1 illustrates schematically those portions of a color television camera necessary for an understanding of the basic invention which include a camera head 10 having a pickup tube 11, lens 12, and deflection yoke 13 for vertical and horizontal deflection of the electron scanning beam. The camera head is controlled by a unit (not shown) which provides the horizontal (H) and vertical (V) drive as well as blanking pulses in the usual manner. The video signal from the pickup tube is processed through a preamplifier 14, a video amplifier 15 (where the aperture and gain are set) and a processing amplifier 16 (where the black level, white level and Gamma are set).

The camera head 10 is shown with only one tube 11, as for black-and-white television, whereas in the NTSC system for color television, three and sometimes four pickup tubes are used to scan the scene received through separate lenses and color filters that separate the red (R), green (G), and blue (B) light. Luminance is derived from the RGB signals as a separate signal (Y) proportional to the sum of the three pickup tube outputs. Here all three pickup tubes are represented by one. A fourth pickup tube is sometimes used for the luminance (Y) signal.

The video signal is modulated (encoded) by a chrominance modulator 19 using a color carrier generated by a stable oscillator 20 tuned to precisely 3,579,545 Hz. The modulated color signal is linked to the television transmitter and/or monitor through a control unit where the audio signal is combined. Although the color carrier per se is not transmitted, gated color carrier bursts bursts are transmitted during horizontal blanking periods for use in synchronizing the frequency and phase of a color reference oscillator in the receiver.

Figure 2:
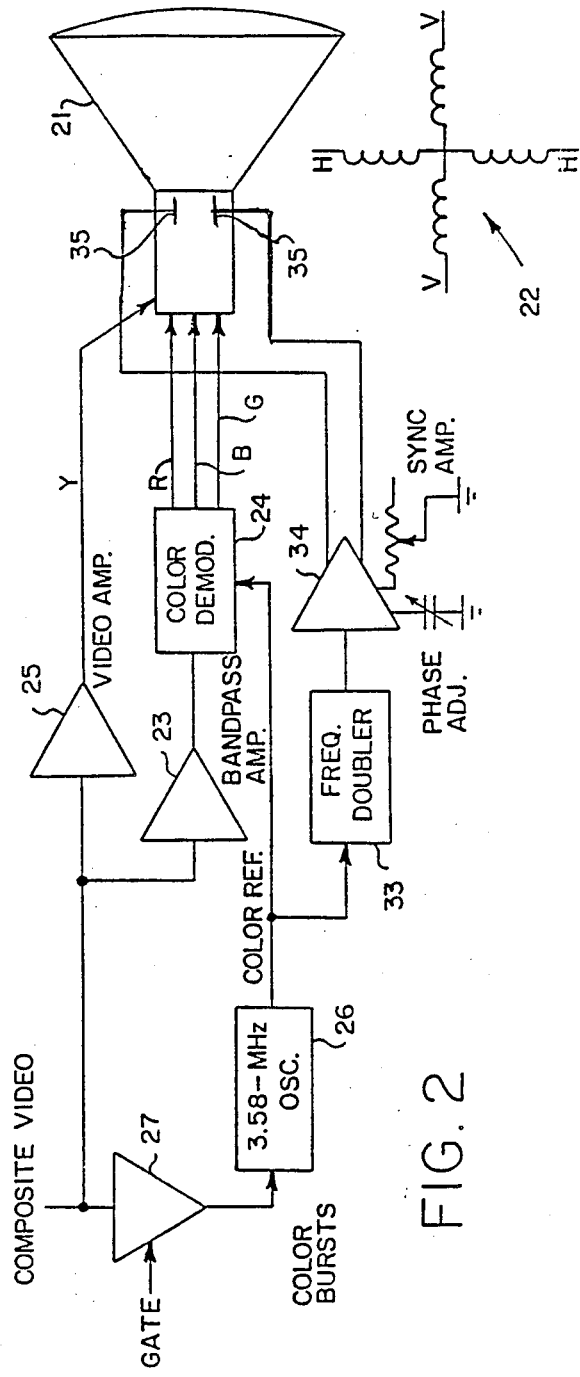
FIG. 2 illustrates that part of a color television receiver embodying the basic invention of the same U.S. Pat. No. 4,589,012.

FIG. 2 illustrates schematically only those portions of a display unit (color television receiver or monitor) which are necessary for an understanding of the invention. Basically, the display unit is comprised of a picture tube (CRT) 21 and deflection yoke 22. The deflection yoke receives the normal horizontal (H) and vertical (V) sync signals to scan 525 lines in two interlaced fields of 262.5 lines. The CRT also receives the normal line and frame blanking pulses during beam retrace periods.

The composite color video is passed through a color bandpass amplifier 23 and demodulator 24 for demodulating the encoded color signals (R, G and B). The luminance signal (Y) is passed by a video amplifier 25 to the picture tube for control of brightness.

For the color demodulator 25, a 3.58-MHz color reference oscillator 26 is synchronized by the gated color bursts received via a gated amplifier 27 during each horizontal sync pulse, i.e., during each line blanking period. In that way, color demodulation (decoding) is synchronized with the color modulation (encoding) at the transmitter. The 3.58-MHz oscillator 26 operates at a stable frequency of 3,579,545 Hz, as does the color carrier oscillator 20 at the camera. The purpose of the gated color bursts is to synchronize the phase of the two oscillators.

What has been described so far is a color television system comprised of a standard NTSC camera and display unit. Only so much of each has been shown as is necessary to understand and practice the invention. In that regard, it should be understood that the NTSC standard is used by way of example, and not limitation. The basic invention which will now be described may be adapted to PAL and SECAM standard systems as well as other standard systems.

Figure 3:
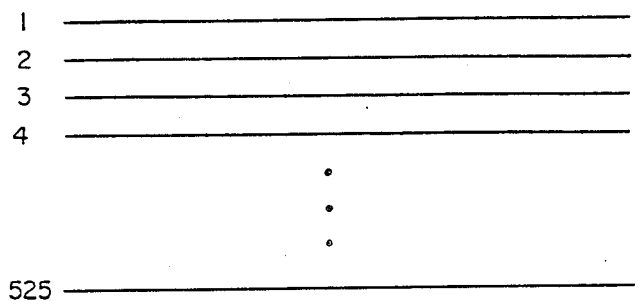
FIG. 3 illustrates the straight parallel scan lines of conventional television scanning and display.
Figure 4:
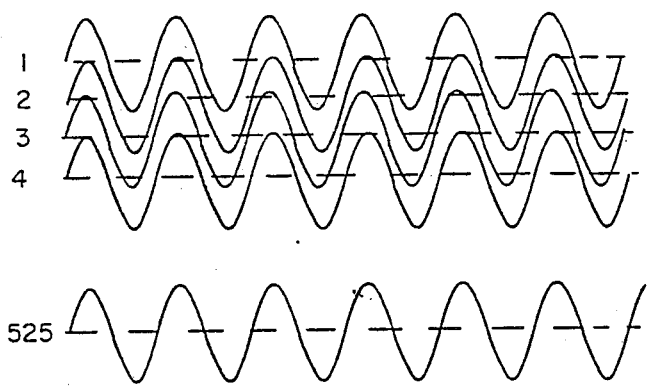
FIG. 4 illustrates the undulating parallel scan lines of the basic invention which increases vertical resolution.

The essence of the basic invention is to use an oscillator, such as the 3.58-MHz color carrier oscillator 20, at the camera to modulate the vertical axis (V deflection field) approximately ¼ to ½ line to line spacing of its 525 scan lines through a driver 30 and electrostatic deflection plates 31 in the camera tube 11, or the equivalent, such as auxiliary deflection coils or the modulation signal superimposed on the vertical deflection signal. The normal (unmodulated) scan follows a pattern shown in FIG. 3. In actuality, the lines are sloped downwardly from left to right as the vertical deflection signal continues to move the beam from the top to the bottom for one field of 262.5 lines. The return (while the line is blanked) is at a much greater rate than the scan, so that what is shown in FIG. 3 more nearly represents the return path for the blanked beam, but for purposes of this description, it may be assumed that the scan lines are exactly horizontal (as indeed they appear to the viewer). The modulation superimposed on adjacent lines from two fields of a frame is then shown in FIG. 4. Because the modulated scan is not in straight lines, each modulated line includes more information (pixels). In other words, 525 lines cover more area in the entire scene than a straight line scan to increase the vertical resolution by about two or more times, depending upon the amplitude of modulation, the beam spot size and bandwidth of the video signal transmitted to the display unit.

The literature speaks of the scan rate as 15,750 lines/sec for convenience, just as it does of the color carrier as 3.58 MHz, but in actuality the number of lines scanned per second are 15,734. Dividing that number of lines into 3,579,545 Hz yields 227.50 cycles of modulation per scan line so the modulation pattern would repeat itself out of phase on every successive line of a field. It is desirable to have the same scanning pattern repeat itself in phase for every line of both fields of a frame. This could be achieved by inverting the modulating 3.58-MHz signal during every other line using the blanking signals to control logic for this phase inversion, but the mathematics of the NTSC standard is fortuitous in that, by doubling the modulating frequency in a frequency doubler 32, there will be 455 cycles of modulation in every line scanned by the camera, and the higher frequency of modulation will increase the number of pixels included in each line scan, thereby increasing vertical resolution even more while also increasing horizontal resolution. Whether a scan line starts with a modulation of phase zero is not important; what is important is only that the same modulation phase be maintained from line to line. Notwithstanding that, a phase adjustment as well as an amplitude adjustment can be made at the driver 30, if desired.

In the display unit, the output of the synchronized 3.58 MHz oscillator 26 is also doubled by a frequency doubler 33 and then applied through a driver 34 to electrostatic deflection plates 35 in order to synchronously modulate the electron beam of the picture tube 21 as it is scanned 525 lines per frame by the yoke 22. The defleciton plats 35, or the equivalent such as auxiliary deflection coils or the modulation signal superimposed on the vertical deflection signal, are aligned with the vertical deflection of the yoke 22. In that manner, the same line scan modulation pattern of the camea is synchronously repeated at the picture tube for the desired increase in vertical resolution.

Synchronization is achieved through control of the phase of the color oscillator 26 at the display unit by the gated color burst. Since phase control of that oscillator is necessary for color demodulation, no penalty is incurred at the display unit. All that is necessary is a frequency doubler, electrostatic deflection plates or the equivalent, and a driver between the plates or coils and the frequency doubler. Note that the camera also requires only a frequency doubler, driver and plates or the equivalent. Everything else about the camera and display unit is the same as for a standard NTSC system.

If a color display unit is not equipped with a frequency doubler, driver and auxiliary deflection means (plates or equivalent coils), the program transmitted from a camera so equipped will be displayed with linear horizontal scan lines. In that sense, the invention is compatible with display units not adapted to display a program with increased vertical resolution.

This basic technique increases vertical resolution by increasing video information in the vertical direction, but since each scan line will now include more picture elements (pixels), it will increase horizontal resolution as well. Thus, for a standard display unit not equipped to modulate the horizontal scan, resolution is improved.

Modulation of the horizontal scan at the camera will not only increase the video information, but also increase the bandwidth of the video signal. This is a direct result of the greater velocity of the electron beam on the target surface. Consequently, to achieve the full potential for increased resolution in both the vertical axis and the horizontal axis, it is necessary to increase the bandwidth of the transmission channel to the display unit. As a general rule, a bandwidth of 12 MHz will yield a resolution equivalent to about 1000 scan lines, and a bandwidth of 14 MHz will yield a resolution equivalent to about 1200 lines. As a rule, each increase of 2 MHz in bandwidth will increase resolution by about 200 lines. However, since resolution in the range of about 1000 lines is equivalent to the resolution of 35 mm film, it is believed that a bandwidth of about 12 MHz would be sufficient to achieve the highest resolution desired, particularly for converting film to tape, or tape to film.

This need for a greater bandwidth in order to reach the full potential of the invention presents a problem where, as in the United States, a broadcast televison channel is limited to 6 MHz. In practice, only one complete sideband of a 4.5 MHz video carirer is transmitted together with only a vestige (small part equal to 1.25 MHz) of the other sideband. The audio carrier is located at the upper end of the sideband, which is 4.5 MHz higher in frequency than the video carrier, and 0.25 Mhz lower than the upper frequency limit of the 6 MHz channel.

The full potential of high resolution television by modulation of the scan lines is achieved in standard transmission through band limited channels by separating out of the video signal from the television camera the modulation frequency as a sideband with pixel information, but without a carrier, amplitude and phase related to the scan modulation frequency, for example 7.16 Mhz in the case of a color subcarrier at 3.58 MHz under the NTSC standards. The pixel inormation is contained in a narrow band (about $\pm\frac{1}{2}$ MHz) of the sidebands. The sidebands with pixel information are then converted down to within the color subcarrier band (in the range of 3.75 to 4.2 MHz) using a heterodyne converter. Finally the down-converted sidebands with pixel information are added back to the video signal out of the camera before processing it through the color encoder for transmission through the bandwidth limited channel.

The transmitted signal may be received and displayed by a standard television receiver or monitor, but to achieve the higher resolution which modulation of the scan line affords, the receiver, or monitor, must be modified to convert the color reference frequency to the line scan modulation frequency (synchronized with the color subcarrier) and, while using the color reference at the standard frequency for color decoding, using the modulation frequency to modulate the line scan of the color display tube at the same time the detected video signal is filtered to separate the down-converted sidebands with pixel information, convert the sidebands with pixel information back up to the modulation frequency using a heterodyne converter, and add the up-converted sidebands with pixel information back into the detected video signal for processing in the receiver or monitor modified to modulate the scan lines for display, all as described in the aforesaid application Ser. No. 06/534,592.

Although it would be preferable to modulate all three color camera tubes synchronously, it is recognized that the luminance contributions L of the CIE (International Commission on Illumination) red and blue primaries are very low ($L_R=0.004$ and $L_B=0.01$), as compared to the green primary ($L_G=0.98$). Consequently, even though the luminance of the red and blue are increased in the Federal Communications Commission (FCC) primary specification to a value that is practical for available color phosphor, it is the sum of the R, G and B signals which produce one luminance unit (reference white) of the luminance signal Y in the proportion 0.30R, 0.59G and 0.11B. Because of this dominance of the signal G in the luminance signal Y produced by a color encoder from a color television camera, it would be possible to practice the basic invention by modulation of only the green camera tube. The human eye would not notice that the red and blue camera tubes were not synchronously modulated when the color video is displayed by synchronous modulation of all three electron beams in the television receiver.

However, although it is possible to modulate only the green camera tube and the R, G and B electron beams in the receiver or monitor, some "aliasing" will occur because the R and B signals together do constitute 41% of the total luminance. Aliasing is the phenomenon of image boundaries flicking up and down as a rsult of interlaced horizontal scans being parallel to the scan lines. If all three camera tubes were synchronously modulated, there would be no aliasing.

Figure 5:
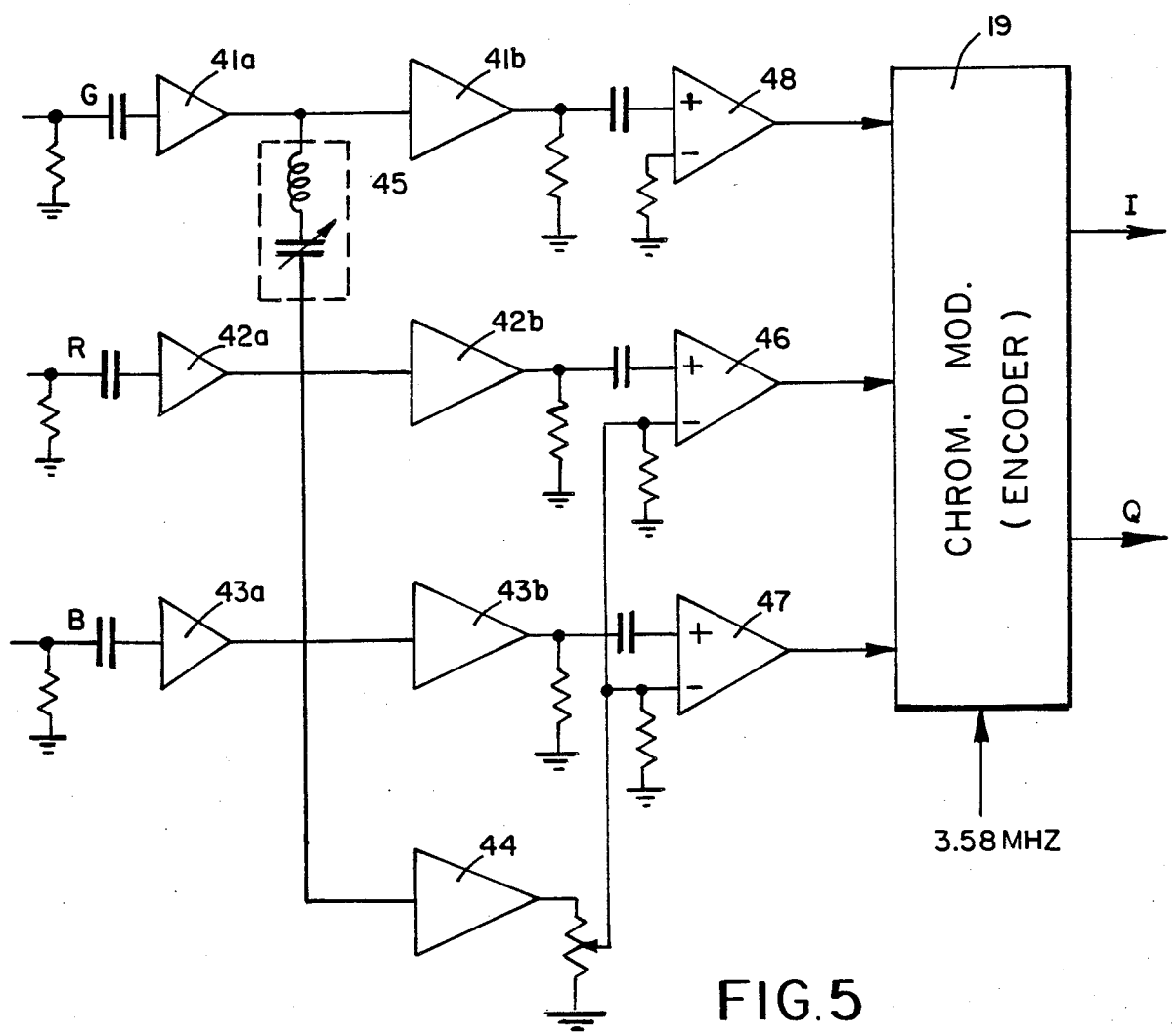
FIG. 5 illustrates a preferred embodiment of the present invention.

Aliasing resulting from the red and blue color camera tubes not being modulated in virtually eliminated in accordance with this invention by subtracting a portion of the green camera signal from each of the R and B signals as shown in FIG. 5. The amount of green added to each is in the same proportion the red and blue signals bear to the total luminance, namely 30% and 11%.

Referring now to FIG. 5, which illustrates a preferred embodiment of the invention practiced in the chrominance modulator 19, or more particularly practiced in the way the R, G and B signals are mixed at the input of the chrominance modulator, each of the camera signals R, G and B are capacitively coupled to bandpass amplifying channels comprised of preamplifiers 41a, 41a, 43a and amplifiers 41b, 42b and 43b. The green signal, which is from the only camera tube modulated at 7.16 MHz (twice the color subcarrier of 3.58 MHz), is coupled to a separate amplifying channel 44 (tuned to the modulation frequency of 7.16 MHz) through a trap filter 45 which couples only a narrow band ($\pm\frac{1}{2}$ MHz) of the green signal G. The output of this fourth channel 44 is then added to the R and B signals at the inputs of the differential amplifiers 46 and 47 to modulate the R and B signals with the proper amplitude of the 7.16 MHz information into the chroma modulator. The voltage-dividing resistors coupling the output of the amplifier 44 into the negative input terminals of these amplifiers 46 and 47 are selected so that less than half the relative amplitude of the G signal is the R signal, and about one sixth the relative amplitude of the G signal is the B signal, and preferably in the same proportion that the R and B signals bear to the G signal in the total luminance signal Y, namely 30% and 11% of R and B, respectively, to 59% of the G signal. Am amplifier 48 is included in the G signal channel to match the signal G with the signals R and B in phase with proper amplitude and power for the chrominance modulation (color encoder) 19.

In that manner, the signals R and B encoded into the I and Q signals along with the signal G are so pseudomodulated with the same 7.16 MHz as the color signal G at the camera that, at the receiver, display by synchronous modulation of the R, G and B electron beams will provide full color display without aliasing. This is so because, although the red and blue color camera tubes are scanned in straight horizontal lines, they are effectively modulated by adding to the R and B signals the 7.16 MHz green modulation to the R and B signals.

It should be noted that the essence of the invention is the pseudomodulation of the signals R and B from the red and blue camera tubes with the signal G from the green camera tube. This may be at the input of the encoder 19 before transmission, or at the output of the color demodulator (decoder) 24 at the receiver of monitor, but it is preferred to do it at the output of the encoder, since the pseudomodulation is done only once for all receivers or monitors, instead of at each one individually. This technique is the same, namely to use a trap filter to pass the narrow band ($\pm\frac{1}{2}$ MHz) of the modulated green camera tube signal that contains the pixel information at the modulation frequency (7.16 MHz in the preferred embodiment), and to add it to the signals R and B from the unmodulated red and blue camera tubes in the same proportion that the signals R and B bear to the total R+B+G, which is the luminance signal. In either case, the color encoder at the camera will produce the I and Q signals, and where a fourth luminance camera tube is not used, also the signal Y from the sum of 0.30R+0.11B and 0.59G.

What is claimed is:

1. An improved method for increasing the vertical resolution of color television display on a picture tube of a program from a color television camera, wherein the camera has three pick-up tubes which produce television camera signals, one tube with a green filter, one tube with a red filter and one tube with a blue filter, and all three pick-up tubes are driven to produce synchronous horizontal scans in interlaced fields of a frame with only the horizontal scan of the green pick-up tube further modulated vertically to scan each line along an undulating path at a predetermined frequency, and wherein all three electron beams for the green, red and blue display of said picture tube are synchronously modulated with the electron beam modulation of the camera pick-up tubes, comprising the steps of filter trapping the television camera signal from said green camera pick-up tube at said predetermined undulating modulation frequency in a narrow bandwidth of about $\pm\frac{1}{2}$ MHz, and combining said filter trapped green television camera signal with television camera signals from said red and blue camera pick-up tubes in a differential amplifier such that said green television camera signal is added to the red and blue television camera signals, thereby pseudomodulating the red and blue television camera signals in synchronism with the green television camera signal as though the electron beam of the red and blue camera pick-up tubes were modulated to scan each line along an undulating path.

2. A method as defined in claim 1 wherein said filter trapped green television signal is combined with said red and blue televison camera signals in about the same proportion that the red and blue televison camera signals contribute to the total luminance display of said picture tube as compared to the green television camera signal.

3. A method as defined in claim 2 wherein the green television camera signal at said predetermined modulation frequency is filter trapped at said camera, said camera having a color encoder, and combined with said red and blue televison camera signals at the input of said color encoder.

4. A method as defined in claim 2 wherein said picture tube is provided with a color decoder, and the green television camera signal at said predetermined modulation frequency is filter trapped at said picture tube and combined with said red and blue signals at the output of said color decoder for said picture tube.

5. In a color television system comprised of a camera having red, green and blue camera pick-up tubes for scanning a scene with parallel synchronized scan lines to derive red, green and blue television camera signals, and a receiver for displaying the composite of red, green and blue signals from said camera tubes, said camera tubes having means for effectively modulating only the green camera tube scan to include points alternately above and below said scan line, as well as said scan line, thereby producing a modulated green television camera signal while not modulating said red and blue camera tube scans except for linear horizontal scan lines, sampling said modulated green television camera signal, and combining with said red and blue television camera signals a portion of said sampled green television camera signal in the same proportion that each red and blue television camera signal constitutes to the total luminance relative to the green signal, thereby psuedomodulating the red and blue camera tube television camera signals for display at said receiver for correcting aliasing errors in the scene displayed in color.

* * * * *